3,666,418
SULPHUR EXTRACTION PROCESS
Hans Joachim Wernicke, Neuenhain, Taunus, Fuchshohl, and Hermann Reitzenstein, Aschau, Chiemgau, Germany, assignors to Messer Griesheim G.m.b.H., Frankfurt am Main, Hanauer Landstrasse, and Uhde, Friedrich G.m.b.H., Dortmund, Germany
Filed Aug. 17, 1970, Ser. No. 64,206
Claims priority, application Germany, Aug. 16, 1969, P 19 41 703.9
Int. Cl. C01b 17/04
U.S. Cl. 23—225 P          4 Claims

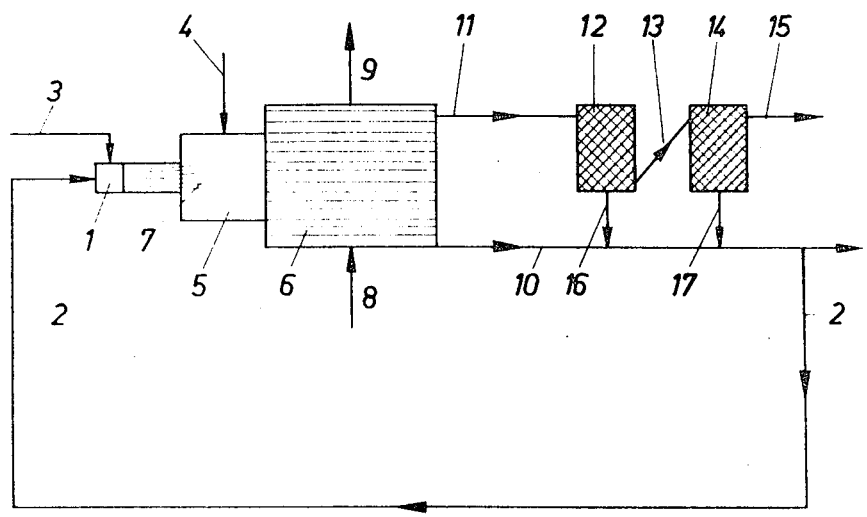

ABSTRACT OF THE DISCLOSURE

A process for obtaining sulphur from hydrogen sulphide containing gases by the reaction of said gases with sulphur dioxide thereby producing sulphur and water. The necessary amount of sulphur dioxide is produced by the combustion of sulphur with oxygen or an oxygen rich gas.

BACKGROUND OF THE INVENTION

The present invention relates to a process for obtaining sulphur from hydrogen sulphide containing gases.

The technical production of sulphur from hydrogen sulphide containing gases nowadays takes place almost exclusively by the so-called improved I.G.-Claus process (see German Pat. No. 666,572), of which there are numerous variants. The sulphur produced thereby depends upon the partial oxidation of hydrogen sulphide according to the following equation:

$$2H_2S + O_2 = 2H_2O + 2S + 2391 \text{ kcal.}/Nm.^3 H_2S \quad (1)$$

This equation admittedly gives the reaction of the process as a whole, but in the case of the complex equilibria involved, further reactions occur, the most important of which are the following:

$$2H_2S + 3O_2 = 2H_2O + 2SO_2 + 5593 \text{ kcal.}/Nm.^3 H_2S \quad (2)$$
$$2H_2S + SO_2 = 2H_2O + 3S + 789 \text{ kcal.}/Nm.^3 H_2S \quad (3)$$
$$S + O_2 = SO_2 + 3241 \text{ kcal.}/Nm.^3 SO_2 \quad (4)$$

All of the foregoing reactions occur not only at high temperatures (about 1000° C.) in an open flame but also at lower temperatures (about 200–400° C.) on catalytically acting surfaces.

In the case of the improved I.G.-Claus process, the hydrogen sulphide containing gas is first burned with a stoichiometric amount of atmospheric oxygen at a high temperature. About 70% of the sulphur introduced in the starting gas is thereby obtained as elementary sulphur vapor which, after condensation, is passed into a collection vessel. The reaction of the residual hydrogen sulphide contained in the reaction gas mixture and of the sulphur dioxide takes place at a comparatively low temperature in one, or at most two, after-connected contact furnaces. A further 22–27% of sulphur thereby obtained in a vaporous state which, after condensation, is removed, so that total yield of sulphur of about 92–97% is obtained.

The above-described process can only practically be carried out when the hydrogen sulphide content of the starting gas is more than 15–20%. If the concentration is lower, the combustion with air no longer provides the heat energy necessary for the maintenance of the process as a whole.

It is possible to go below this concentration limit when additional hot gas is admixed with the proportion of the starting gas intended for burning, which is then carried out with air or oxygen. Due to the additional burning of hot gas, the process becomes less economic, the total yield of sulphur is reduced and the plant costs are increased. An additional supply pipe for hot gas must be provided and devices are needed for the control of the thermal value and for the regulation of the amount.

It is also known (see Chemie-Ing. Techn., 1967, p. 517), to produce sulphur from starting gases having low content of hydrogen sulphide, by passing the starting gas together with sulphur dioxide through contact furnaces. This process requires that sulphur dioxide be available. As a rule, it also necessitates external thermal energy.

SUMMARY OF THE INVENTION

It is an object of the present invention to provide a process for the extraction of sulphur from sulphur containing gases which is not subject to the drawbacks of the prior art.

It is another object of the present invention to provide for a process which is simple and expedient in operation.

It is a further object of the present invention to provide for a process that utilizes existing machinery and is therefore relatively inexpensive to carry out.

Further objects and advantages of the invention will be set forth in part in the following specification and in part will be obvious therefrom without being specifically referred to, the same being realized and attained as pointed out in the claims hereof.

Broadly speaking the problem with which the present invention is concerned is to carry out a process similar to the improved I.G.-Claus process in which the concentration of hydrogen sulphide in the starting gas can be considerably below 15%, without encountering the aforesaid drawbacks.

According to the present invention there is provided a process for obtaining sulphur from hydrogen sulphide-containing gases in which at least a part of the hydrogen sulphide supplied is converted essentially into sulphur and water by the reaction with sulphur dioxide in a mixing chamber of a steam generator and optionally at least one after-connected contact furnace. The sulphur dioxide necessary for the reaction being produced by the combustion of sulphur with oxygen or an oxygen-rich gas in a burner connected to the mixing chamber of the steam generator.

Initially a part of the sulphur dioxide received in the improved I.G.-Claus process is formed according to Equation 4 and not, as previously carried out, by Equation 2. It is advantageous to completely inhibit the direct reaction of hydrogen sulphide with oxygen according to Equations 1 and 2 and to exclusively burn sulphur in the burner with oxygen or an oxygen-rich gas. Thereafter one reacts the resultant sulphur dioxide, in the combustion chamber of the steam generator, with the hydrogen sulphide, according to Equation 3. The amount of the sulphur dioxide produced thereby, in the burner, is expediently in the stoichiometric ratio of 1:2 to the amount of hydrogen sulphide passing into the plant.

Burners for the combustion of liquid sulphur with air are known (see German patent specification No. 1,178,-407). For carrying out the process according to the present invention, there are especially suitable jet burners (see for example, from U.S. Pat. No. 3,092,166), because these burners are intended, in particular, for the combustion with oxygen or an oxygen-rich gas and ensure a complete reaction of the oxygen with the sulphur.

As a rule, it is most advantageous to burn part of the sulphur in the burner which has just been produced in the plant, however, the process according to the present invention is not so restricted. Since the sulphur burned to sulphur dioxide in the burner is not lost, in particular cases there can also be used sulphur which has not only just been obtained in the plant. For example, sulphur-containing filter residues can be used. If, however, sulphur is used, which has been obtained in the plant, a certain amount of sulphur is continuously passed in circulation through the steam generator and the possibly after-connected contact furnaces, the heat requirement of the process thereby being covered by itself and the disadvantageous combustion of a heating gas with oxygen avoided.

The concentration of hydrogen sulphide in the starting gas can be considerably below 15%.

Carrying out the process according to the present invention is not dependent upon the use of contact furnaces. If there is only required relatively low sulphur yields, the reactions can be carried out in the burner and mixing chamber of the steam generator.

The invention accordingly comprises the several steps and the relation of one or more of such steps with respect to each of the others, all as exemplified in the following detailed disclosure, and the scope of the application of which will be indicated in the claims.

BRIEF DESCRIPTION OF THE DRAWING

For a fuller understanding of the nature and objects of the invention, reference should be had to the following detailed description, taken in connection with the accompanying drawings, in which:

The single view is a schematic representation of a plant for carrying out the process of the instant invention.

The foregoing and other objects of the invention will be best understood from the following description reference being had to the accompanying drawing, where there is provided a jet burner 1, wherein the sulphur produced in the plant is burned with oxygen to give sulphur dioxide. Sulphur enters through a first pipe 2 and oxygen through a second pipe 3 in a jet burner 1. The hydrogen sulphide-containing starting gas passes through a first conduit 4 into a mixing chamber 5 of a steam generator 6 and from the jet burner 1, sulphur dioxide 7 passes into the mixing chamber 5. The amount of sulphur dioxide 7 produced in the jet burner 1 to the amount of hydrogen sulphide entering the plant through the first conduit 4 is in the ratio of 1:2. Water enters through a third pipe 8 into the steam generator 6 and leaves in the form of steam through a fourth pipe 9. About 70% of the sulphur entering the steam generator 6 in the form of sulphur dioxide and hydrogen sulphide is withdrawn therefrom, after condensation, in a liquid state through a second conduit 10. The residual reaction gas flows from the steam generator 6 via a third conduit 11 to a first contact furnace 12, through discharge 13 to a second contact furnace 14 and through a fifth pipe 15 into an after-burner furnace (not shown). After condensation, almost all the remaining sulphur is obtained in the contact furnaces 12 and 14 in liquid form and is combined, via conveyor pipes 16 and 17, with the liquid sulphur in the second conduit 10. The necessary amount of liquid sulphur thus obtained is branched off from the second conduit 10 and passed via the first pipe 2 back into the jet burner 1, the remainder of the sulphur being withdrawn as product. The pressures and temperatures uesd, as well as the construction of the parts of the apparatus correspond essentially to those of the improved I.G.-Claus process.

Before entry into the contact furnaces 12 and 14, respectively, the temperature of the reaction mixture can, if necessary, be increased to the optimum temperature range by intermediate heating burners. These burners are expediently operated, in the same way as the main burner, with oxygen and also with sulphur as fuel.

If the starting gases available also contain, in addition to hydrogen sulphide, other sulphur-containing gaseous components, such as carbon disulphide, carbonyl sulphide, mercaptans and/or other combustible substances, such as, for example, hydrocarbons in any desired form, these can also be reacted by means of the process according to the present invention without disadvantage or alteration. The amount of oxygen necessary for the combustion thereof being supplied via the sulphur burner or separately, in appropriate amount.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A process for obtaining sulphur from a gas mixture containing from 2–20 percent of hydrogen sulphide, with the aid of a burner and a steam generator having a mixing chamber, comprising the steps of:

producing an amount of sulphur dioxide by reacting in said burner sulphur with a gaseous substance selected from the group consisting of oxygen and oxygen-rich gases containing at least 60 percent of oxygen, the ratio of said amount of sulphur dioxide to the amount of said hydrogen sulphide being approximately 1:2, and reacting thermally said gas mixture with said amount of sulphur dioxide in said chamber, thereby effecting a conversion of said hydrogen sulphide essentially to sulphur and water and using at least a portion of said sulphur to produce the sulphur dioxide in said burner.

2. A process, as claimed in claim 1, and further reacting said sulphur dioxide with said gases in at least one contact furnace after-connected to said steam generator.

3. A process as claimed in claim 1, wherein said combustion of said sulphur is carried out in a jet burner.

4. A process, as claimed in claim 1, and condensing said sulphur and thereafter returning same in a liquid state back to said burner.

References Cited
UNITED STATES PATENTS

| | | | |
|---|---|---|---|
| 2,384,926 | 9/1945 | Jones | 23—225 |
| 2,630,374 | 3/1953 | Miller | 23—225 |
| 2,767,062 | 10/1956 | Duecker | 23—226 |

OSCAR R. VERTIZ, Primary Examiner

G. O. PETERS, Assistant Examiner